United States Patent [19]

Beilfuss

[11] Patent Number: 4,831,313
[45] Date of Patent: May 16, 1989

[54] TWO SPEED MOTOR CONTROLLER

[75] Inventor: Robert C. Beilfuss, Coppell, Tex.

[73] Assignee: Lennox Industries, Inc., Carrollton, Tex.

[21] Appl. No.: 96,546

[22] Filed: Sep. 14, 1987

[51] Int. Cl.$^4$ .............................................. G05B 5/00
[52] U.S. Cl. ...................................... 388/822; 361/22; 361/24; 62/324.1; 388/903; 388/915; 388/921; 388/933; 388/934
[58] Field of Search ......................... 318/306, 334–335, 318/308, 309; 361/22, 25, 27–28, 29; 62/324, 325

[56] References Cited

U.S. PATENT DOCUMENTS

| | | | |
|---|---|---|---|
| 3,585,451 | 6/1971 | Day | 361/24 |
| 3,636,369 | 1/1972 | Harter | 361/28 |
| 3,740,613 | 6/1973 | Strachan | 361/27 |
| 3,794,858 | 2/1974 | Squiers | 361/24 |
| 3,878,436 | 4/1975 | Bogel | 361/28 |
| 3,909,675 | 9/1975 | Hirsbrunner et al. | 361/27 |
| 4,042,966 | 8/1977 | Newell et al. | 361/22 |
| 4,253,130 | 2/1981 | Newell | 361/22 |
| 4,281,358 | 7/1981 | Plouffe et al. | 361/27 |

OTHER PUBLICATIONS

Texas Instruments publication, "10 AA Solid State Motor Protection Module", Oct. 10, 1972, pp. 1–9.

Primary Examiner—William M. Shoop, Jr.
Assistant Examiner—David Martin
Attorney, Agent, or Firm—Allegretti & Witcoff, Ltd.

[57] ABSTRACT

An electronic control for regulating the operation of a two-speed motor in a heat transfer system such as a heat pump or air conditioner. The control receives high and low demand signals from a thermostat and a motor unit operates at high and low speeds in response to, respectively, high and low speed signals. The control includes an initial timer, high and low speed operators, and a speed change delay. The initial timer detects the occurrence of a demand signal from the thermostat, counts a predetermined period of time, and responsively issues an initial timing completion signal. The high and low speed operators detect the timing completion signal as well as either a high or low thermostat demand signal. One of the operators then responsively issues either a high or low speed signal to the motor unit. The motor unit accordingly operates at a high or low speed. The speed change delay detects the change in a thermostat demand signal from a high to a low state or a low to a high state. The delay disables the high and low speed operators for a predetermined period of time, responsively enabling either the high or low speed operator to begin after the delay period has passed.

8 Claims, 4 Drawing Sheets

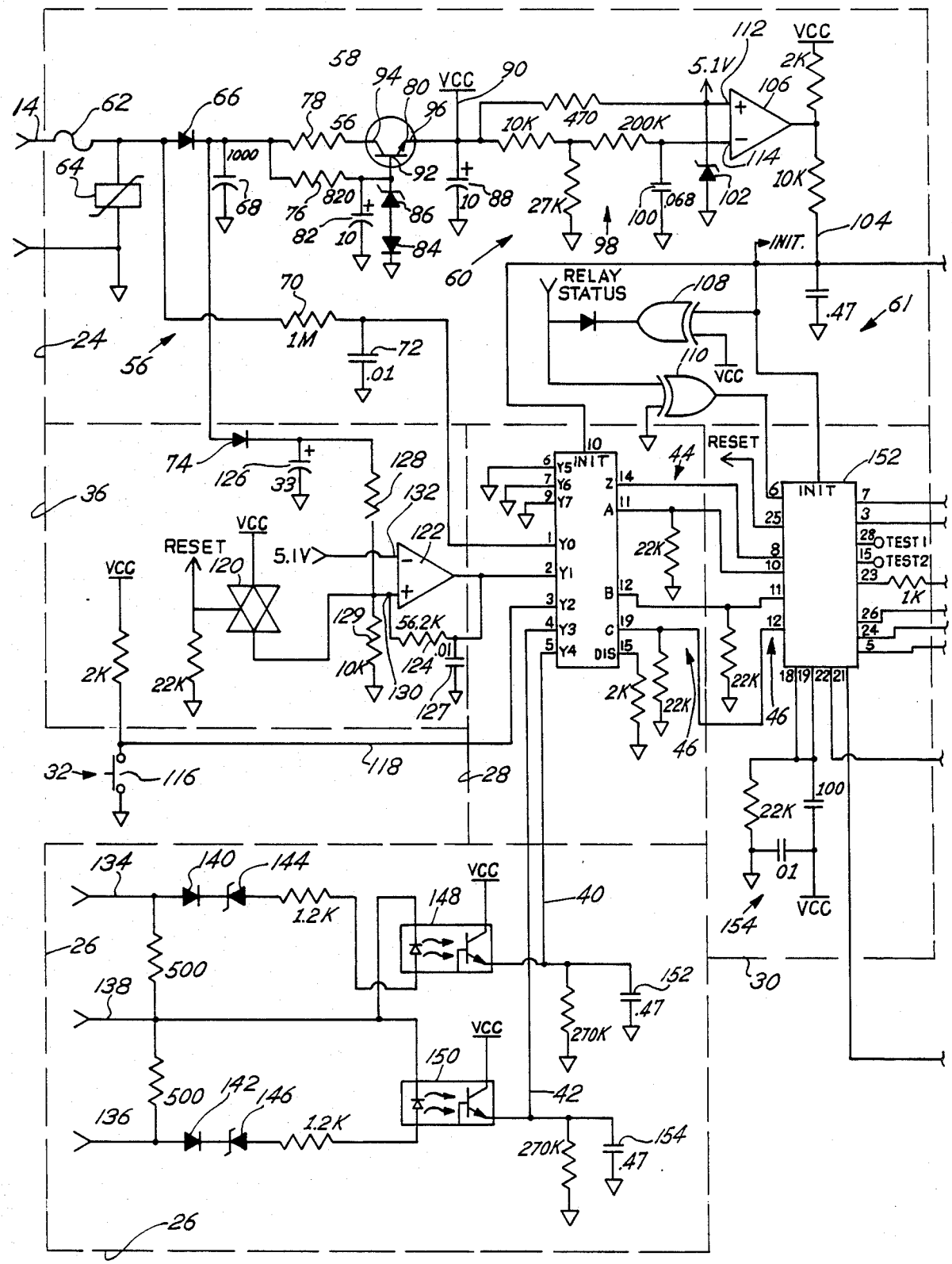

TWO SPEED MOTOR CONTROLLER

COPYRIGHT PROTECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to electrical control systems and more specifically to a control for regulating the operation of a two-speed motor in a heat transfer system, such as an air conditioner or heat pump.

Typical air conditioners and heat pumps often include a thermostat and motor unit. The thermostat senses ambient temperature. When the temperature rises or falls beyond a predetermined standard, thus indicating that action is required by the motor unit, the thermostat will emit an electrical signal.

In many applications, the thermostat may emit at least two different signals, calling for two different types of action by the motor unit. If, for example, the ambient temperature is substantially different than a preset standard, the thermostat may emit a first, or high, signal calling for a high level of output by the motor unit. Conversely, if the ambient temperature is only slightly different than the desired temperature, the thermostat may emit a second, or low signal, calling for a lower level of output by the motor unit.

Many thermostats operate with "Class II" power. Class II power may be defined as only including electrical signals having a maximum R.M.S. voltage of 30 volts, and that are limited to a maximum current of 3.2 amperes.

The thermostat may be, for example, a multi-stage mercury bulb or a dual output electronic thermostat. Such thermostats may request no action by the motor unit, or high or low levels of action by the motor unit, or a change in the level of action by motor unit between high or low output states.

The motor unit may include both a compressor and an electric motor. The motor may run at either a high or low speed, depending on whether the motor receives a high or low speed input.

The compressor is operated by the motor and contains a predetermined amount of oil. When the motor and compressor begin operation, the compressor pumps a limited amount of the oil out of its crankcase. When the compressor continues running, the oil recirculates through the system, working back into the compressor crankcase. If, however, the compressor is started and stopped a number of times in quick succession, too much oil will have been pumped out of the crankcase for proper operation of the compressor. Thus, a rapid succession of attempts to start the compressor working may cause permanent damage to the compressor.

Similarly, changing the speed of the compressor, without allowing the compressor to first stop may damage the compressor. Also, starting problems may occur within the compressor, because time is required to let the refrigerant pressure equalize. Again, operation of the compressor under such a circumstance may cause permanent damage. Thus, the motor unit should be controlled to avoid operation under such conditions and thus avoid damage to the compressor.

Moreover, the operation of the electric motor unit driving the compressor should be controlled so that the motor will not operate if it is subject to a serious fault condition. For example, the rotor may become locked or the motor may be subjected to a severe overload or underload. Also, the line voltage applied to the motor may decrease substantially (during, for example, a "brownout") or the temperature of the motor windings may increase to an unacceptable level. Permanent damage to the motor may occur if it is allowed to continue operating under such conditions.

SUMMARY OF THE INVENTION

In a principal aspect, the present invention is an improved control system for regulating the operation of a two speed motor in a heat transfer system. The system includes a thermostat, control, and motor unit. The control receives high and low demand signals from the thermostat. The motor unit operates at high speed in response to receiving a high speed motor signal and at a low speed in response to receiving a low speed motor signal.

The control includes an initial timer, high and low speed operators, and a speed change delay. The initial timer detects the occurence of either a high or low demand signal from the thermostat. In response, the initial timer counts a predetermined period of time and then issues an initial timing completion signal.

The high speed operator detects a high demand signal and the initial timing completion signal and responsively provides a high speed signal to the motor. Similarly, the low speed operator detects a low demand signal and the initial timing completion signal and responsively provides a low speed signal to the motor.

The speed change delay detects a change in the demand signal from a high to a low state or from a low to a high state. Upon sensing the change in demand from high to low, the delay disables the high speed operator, counts for a predetermined period of time, and then responsively enables the low speed operator. Upon sensing the change for demand from a low to a high state, the delay similarly disables the low speed operator, counts for a predetermined period of time, and then responsively enables the high speed operator.

In another aspect, the control system further includes a fault sensor and a stop function. The fault sensor detects a condition within the motor unit and responsively issues a fault signal if a problem with the motor is detected. The stop function detects the fault signal and responsively disables the motor unit from continued operation while the fault condition exists.

Thus, a realized object of the present invention is an improved control for regulating the operation of a two-speed motor unit in a heat transfer system. Another realized object is a control that more reliably detects a thermostat demand signal and provides an appropriate signal to the motor and compressor. Still another realized object is a control that more reliably controls the operation of a two-speed motor unit and disables the motor upon sensing a fault within the system.

A further realized object of the present invention is a control for a two-speed motor that is less expensive to make and use and easier to connect to a heat transfer system. Still a further object is a two speed motor control that incorporates more control functions within a single device and that uses fewer discrete components.

These and other objects, features, and advantages of the present invention are discussed or apparent in the following detailed description.

BRIEF DESCRIPTION OF THE DRAWING

A preferred embodiment of the present invention is described herein with reference to the drawing wherein.

DETAILED DESCRIPTION OF A PREFERRED EMBODIMENT

Figure 1:
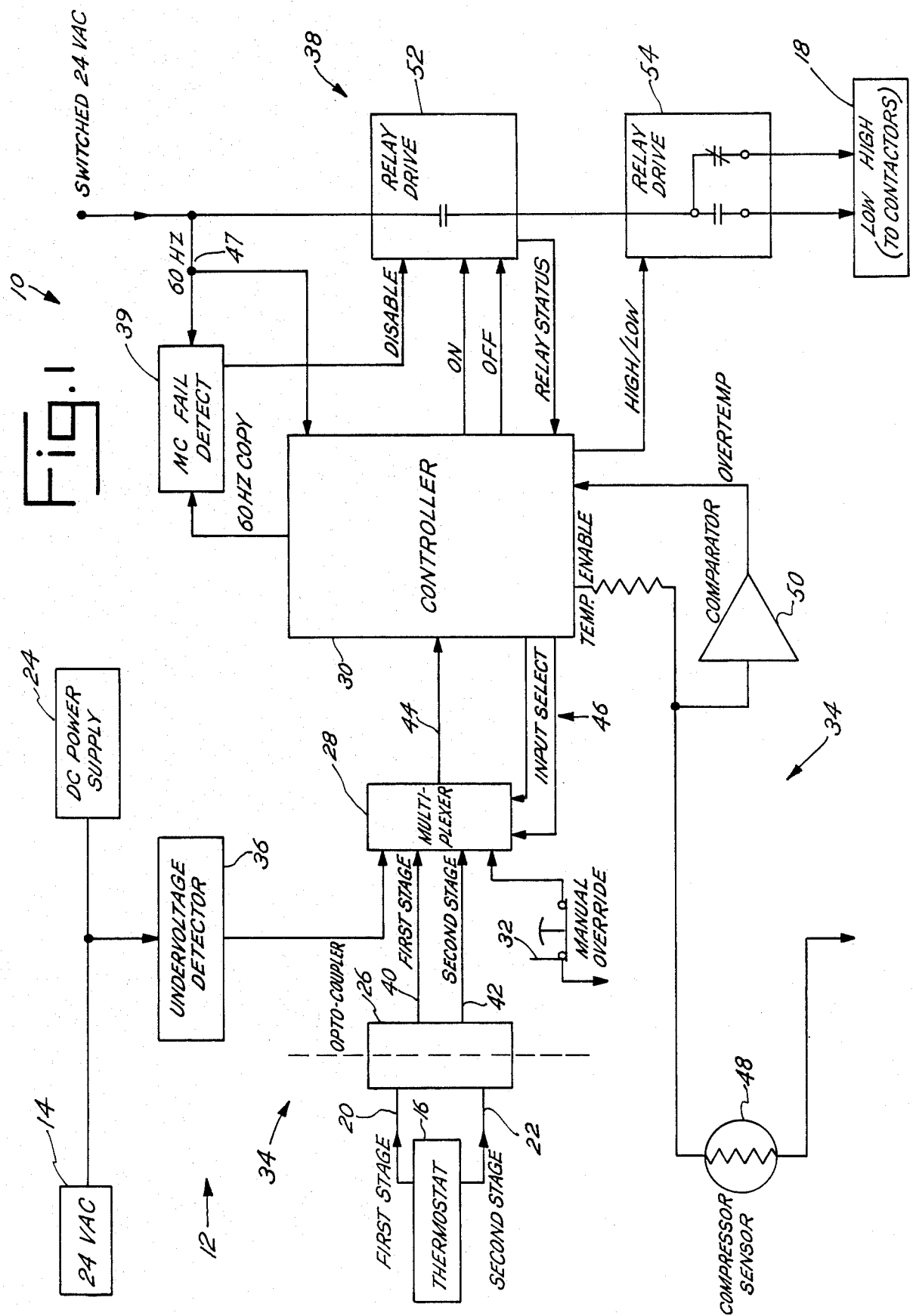
FIG. 1 is a block diagram of the present invention.
Figure 2:
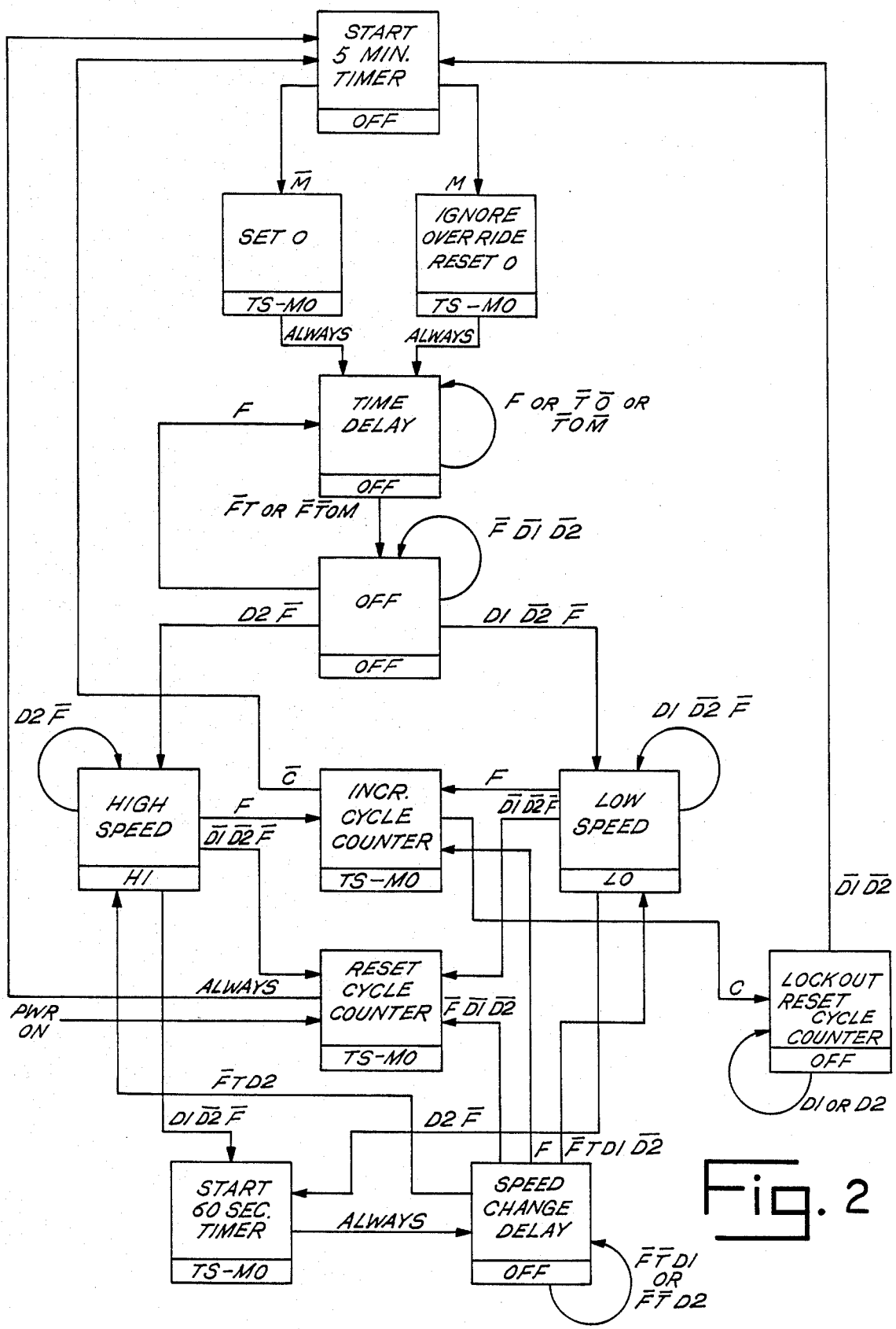
FIG. 2 is a state diagram showing how the invention of FIG. 1 responds to input signals.

Referring to FIGS. 1-3, a preferred embodiment of the present invention is shown as an improved control, generally designated 10, for regulating the operation of a two speed motor unit in a heat transfer system 12, such as an air conditioner or heat pump. As shown in FIG. 1, the system 12 includes an electrical power source 14, thermostat 16, and two speed motor unit 18, as well as the control 10.

The power source 14 is a standard 24 volt R.M.S., A.C. power supply (Class II power) commonly used to operate thermostats in heat transfer systems. The thermostat 16 senses ambient temperature, and includes first and second outputs 20, 22. The thermostat 16 gives a first, high signal along the first output 20 and a low signal when the ambient temperature is substantially different than a preset temperature and operation of the system 12 will reduce this differential. The thermostat 16 gives a second, low signal but no high signal along the second output 22 when the ambient temperature is only slightly different than the preset temperature and operation of the system 12 will reduce the differential.

The motor unit 18 includes both a three-phase electrical motor, or a single phase motor and a compressor and contactors interconnected to the motor (not shown). The control 10 itself includes a D.C. power supply 24, opto-coupler 26, multiplexer 28, controller 30, manual override switch 32, fault detector 34, undervoltage detector 36, relay circuitry 38, and microprocessor fault detection circuitry 39.

The D.C. power supply 24 is interconnected to the power source 14 and provides a substantially constant 9 volt D.C. power supply and a 5.1 volt reference signal for the operation of the control 10. The opto-coupler 26 includes first and second stage lines 40, 42 and receives signals from the thermostat 16 via the first and second outputs 20, 22. The opto-coupler 26 keeps the thermostat 16 and related circuitry electrically isolated from the rest of the control 10. In response to high or low demand signals from the thermostat 16, the opto-coupler 26 transmits corresponding high or low demand signals to the multiplexer 28 via the first and second stage lines 40, 42.

The multiplexer 28 receives inputs from the undervoltage dectector 36, manual override switch 32, and first and second stage lines 40, 42, as well as the controller 30. The multiplexer 28 then delivers one signal, via the multiplexer line 44, to the controller 30.

The controller 30 sends an instruction, via the select lines 46, to the multiplexer 28 to "advise" the multiplexer 28 which signal it will check at a particular time. The controller 30 receives input signals from the multiplexer 28 as well as the fault detector 34, relay drive circuitry 38, microprocessor failure detection circuitry 39, and a switched A.C. line 47.

The fault detector 34 includes a compressor temperature sensor 48 and comparator 50. The sensor 48 emits a signal relating to the operating temperature of the motor unit 18. If the signal varies from a predetermined standard, indicating that the motor unit 18 has developed a fault and is overheating, the comparator 50 sends an overtemperature fault signal to the controller 30.

The relay drive circuitry 38 includes first and second drive circuits 52, 54. The first drive circuit 52 receives inputs from the controller 30. The first drive circuit 52 responsively either does or does not supply power to the motor unit 18.

The second drive circuit 54 is advised by the controller 30 whether the motor unit 18 should operate at a high or low speed. The second drive circuit 54 then responsively channels any signal from the first drive circuit 52 to either the high or low contactors of the motor in the motor unit 18. Thus, upon receiving a signal from the multiplexer 28 indicating that the thermostat 16 has made a first or second level demand, the controller 30 gives an appropriate signal to the relay circuitry 38 to power the electric motor in the motor unit 18.

The controller 30 receives inputs from the first relay drive circuit 52 and shut off switch. The shut off switch operates to disable the motor unit 18 if a serious flaw or other condition has developed, such that continued operation of the motor unit 18 is not desired. The first drive circuit 52 provides a status signal to the controller 30, advising the controller 30 whether the first drive circuit 52 either is or is not supplying power to the motor unit 18. The first drive circuit 52 thus provides the controller 30 with an indication whether its instructions are being followed or whether the fault has developed.

The switched A.C. line transmits a signal from a shut off switch within the compressor of the motor unit 18. If the pressure varies from a predetermined standard, the switched A.C. signal along the line 47 may vary from the A.C. signal received by the controller via the undervoltage detector 36 and multiplexer 28. If a fault does develop, the controller 30 may appropriately switch the relay drive circuitry 38 and thus influences the operation of the motor unit 18.

The microprocessor fault detection circuitry 39 takes an input from the controller 30 as a check whether the controller 30 has developed a fault. If so, it delivers a signal back to the controller 30, telling it that a fault has developed and that appropriate steps should be taken.

During the operation of the control 10, the thermostat 16 may sense that the surrounding air temperature has, for example, increased above a predetermined level. The thermostat 16 then sends either a first or second level demand signal along one of the lines 20, 22. The line 20 is used, for example, when the differential between the desired and actual temperatures is severe. The signal is received by the opto-coupler 26, which again sends an appropriate signal along either the first or second stage lines 40, 42.

The multiplexer 28 maintains the signal until the controller "asks", via the input select lines 46, for the thermostat state. The multiplexer 28 then delivers a signal representative of the thermostat demand level to the controller 30 via the multiplexer line 44.

The controller 30 sends an ON signal to the first relay drive circuit 52, so that power will be supplied to the motor unit 18. The controller 30 also sends a signal to the second relay drive circuit 54 that is either high or low, depending on whether the first or second level thermostat demand has been made.

Periodically the controller 30 also checks the status of the first relay drive circuit 52 to determine whether the relay drive circuitry 38 has developed a fault. If an inappropriate signal is then received, the first relay drive circuit 52 may be switched off.

The microprocessor failure detection circuitry 39 receives a 60 hertz line signal from the controller 30. The circuitry 39 also receives a 60 hertz line signal from the pressure switches via the line 47. If the microprocessor failure detection circuitry 39 senses a discrepency between these two signals, it may send a disable command to the first relay drive circuit 52.

Similarly, if the compressor temperature sensor 48 indicates that a fault has developed, the comparator 50 will send a fault signal to the controller 30.

The controller 30 will normally delay five minutes between successful operations of the electrical motor. If the compressor is being tested, and a serviceman would prefer to monitor attempted start-ups of the system 12 in quick succession, he or she need not wait the five minutes and may thus be more efficient in repairing the unit.

The serviceman may simply push the manual override switch 32. The signal from the manual override switch 32 is sent to the multiplexer 28. When the controller 30 requests the status of the manual override switch 32, the multiplexer 28 sends a signal, via the multiplexer line 44, that the manual override switch 32 has been pushed. The controller 30 will then appropriately change the timing sequence so that the motor and compressor of the motor unit 18 may be switched on and off more rapidly, under the supervision of the serviceman.

The controller 30 receives signals from the switched A.C. line 47, in addition the 60 hertz signal from the power source 14 and multiplexer circuit 28. If both signals are not substantially equivalent, having the same 60 hertz frequency with only a slight phase shift, the controller 30 may be malfunctioning. Accordingly, the microprocessor failure detection circuitry 39 may issue a disable signal to close the first relay drive circuit 52.

The D.C. power supply 24 receives a 24 volt A.C. input signal from the 24 volt A.C. power source 14. The power supply 24 provides a substantially constant 9 volt D.C. source of power for the rest of the controller 10.

The undervoltage detector 36 detects when the 24 volt source of power has dropped below a predetermined standard and responsively indicates that the line voltage for the motor unit 18 may also have dropped below the safe operating limits for the electrical motor. Upon sensing such a condition, the undervoltage detector 36 issues a disable signal to the multiplexer 28 and, thus, eventually to the controller 30. Of course, the undervoltage detector 36, like other fault sensors, may be deleted from the control 10 without significantly interferring with the primary function of the controller 30 during normal operation.

The control 10 includes still further safety features to help insure that the control 10 will stop the system 12 if the control 10 should malfunction. For example, the controller 30 periodically transmits a rapid, predetermined sequence of enable and disable signals to the first relay drive circuit 52. If the relay drive circuitry 52 is functioning properly, a predetermined sequence of relay status signals should be sent to the controller 30 by the first relay drive circuit 52.

If the predetermined signal sequence does not occur, the control 10 may be malfunctioning. Accordingly, the controller 30 may send a disable signal to the first relay drive circuit 52, thus preventing damage that might occur if the system 12 were to keep operating.

The controller 30 also checks the status of the fault detector 34 five times per second. Again, should a malfunction develop, the controller 30 may send an extended disable signal to the first relay drive circuit 52 and thus turn off the system 12.

The control 10 also provides timing and safety functions in response to a thermostat request to change speed either from high to low or low to high. The control 10 enforces a 60 second off period for the motor between speed changes in order for refrigerant pressure differential across the compressor to decrease, which reduces starting torque.

The control 30 normally delays five minutes before allowing the operation of the system 12 after either the application of power or loss of thermostat demand. As discussed, however, this delay can, be bypassed while servicing the unit.

As previously discussed, the control 10 monitors the voltage level of the Class II power in the motor control circuit, since this voltage is normally related to the motor line voltage. This monitoring function is disabled for a few tenths a second upon startup of the motor, however, to allow for a voltage drop during lock rotor starting currents. Otherwise, the feature is constantly active. On detection of a low voltage condition, the motor operation is halted and kept off for at least five minutes. The motor will not be started or restarted under low voltage conditions.

The motor winding temperature is monitored by the control 10 using Positive Temperature Coefficient (PTC) thermistors within the motor. The high limit resistance trip for the thermistors is normally is between 16,000 to 24,000 ohms. The reset resistance ranges between 5,500 to 6,900 ohms. When the control 10 detects an over-temperature condition, the motor operation is halted. The motor operation will not resume for a minimum of five minutes or until the resistance lowers to the reset range specified above.

In the case of where a safety switch (such as a high-pressure limit) terminates motor operation, the control 10 will sense this and similarly prohibit motor operation for five minutes, even if the safety switches are reset in less than five minutes.

If three faults, such as overtemperature, low voltage, or safety switch interrupt, occur during one thermostat demand period, the control 10 will lock out motor operation until the thermostat demand is removed or the power supplied to the control 10 is terminated.

A "thermostat demand period" is defined as the time when the thermostat 16 is signaling a demand for first stage or second stage or both stages. The thermostat 16 may switch between first and second stages of demand during a thermostat demand period.

In the preferred embodiment, the threshhold of undervoltage detection is approximately 17.5 volts A.C. The brownout threshhold hysteresis is approximately 3 volts A.C., such that once the voltage of the power supply (normally at about 24 volts) drops to approximately 17.5 volts, the voltage must increase to at least about 20.5 volts before the system 12 will again begin operation.

Upon a compressor activation, however, the control 10 will ignore an undervoltage condition for approximately 300 miliseconds. Sensing a brownout condition during regular compressor operation, however, causes the compressor operation to be suspended for at least five minutes.

If the compressor operation is interrupted again three times in any one thermostat demand cycle, the controller again locks out compressor operation until the thermostat 16 is reset or power is interrupted. Similarly, the controller 30 will ignore momentary thermostat openings and closings to avoid increase cycling due to faulty thermostat operation.

The logic for which the control circuitry determines which signals to issue to the relay drive circuits is shown in the state diagram of FIG. 2. FIG. 2 depicts the 12 possible states for the controller 30.

The state diagram of FIG. 2 is unambiguous. Thus, the controller's output for each set of inputs from the thermostat 16, manual override switch 32, and external sensors, (such as the fault detector 34), the state of the controller 30 and the controller's output to the relay drive circuitry 38 is shown.

The inputs to the controller 30 are represented in the state diagram by arrows pointing to each of the state blocks S1000-S1011, which represent the twelve possible states of the controller. Each arrow points to the state to which the controller 30 moves after sensing a particular signal. The notation above each line having an arrow represents what particular signal has been sensed by the controller 30. For convenience, the signals are abbreviated as shown in the following table:

| INTERNAL AND EXTERNAL SIGNALS TO THE CONTROLLER | |
|---|---|
| Signal | Description |
| T: | A preset time for delaying operation and moving to the next logic state has been met. |
| C: | A preset number for unsuccessful attempts at operation of the system 12 has been exceeded. |
| D1: | A first stage demand signal has been issued by the thermostat 16. |
| D2: | A second stage demand signal has been issued by the thermostat. |
| M: | The manual override switch 32 has been depressed. |
| O: | An internal notation, or flag, indicating that initial delay time between successive attempts to initiate operation of the system should be substantially reduced, since the manual override switch was depressed. |
| F | Either the compression sensor 48, shut off switch, or undervoltage detector 36 has sensed a fault in the operation of the system 12, and the continued operation of the motor unit may damage the system. |
| OUTPUTS | |
| OFF: | The microprocessor state has turned off the relay drive circuitry 38 such that the electric motor will not operate. |
| HIGH: | The controller 30 has sent a signal to the relay drive circuitry 38 such that the electric motor will operate at a high speed. |
| LOW: | The controller 30 has sent a signal to the relay drive circuitry such as the electric motor will operate at a low speed. |
| NOTATION | |
| ¯ : | Such a "bar" above any of the previously defined letters indicates that the reference signal is the opposite of the signal that is signified by the same letter but without a bar. Thus, while "D1" indicates a first stage heat demand signal issued by the thermostat 16, "D̄1" indicates the lack of a first |

| -continued | |
|---|---|
| INTERNAL AND EXTERNAL SIGNALS TO THE CONTROLLER | |
| Signal | Description |
| | stage demand signal issued by the thermostat 16. |

The output of the controller 30 may be signified by the characters at the bottom of each of the 12 state blocks. "Off", "High", or "Low" thus indicate that the controller 30 is either issuing, respectively, either no signal or a high run signal, or low run signal to the relay drive circuitry 38.

In addition, the characters "TS-MO" at the bottom of the state block indicate that the controller 30 is in a Transient State. Consequently, the controller 30 will Maintain the Output that it had in the immediately preceding state block.

Upon first starting, as shown in FIG. 2 the controller 30 receives a power signal from the power source 14 while in the initial state S1000. An Off signal is issued by the controller 30. The controller 30 then always moves to state S1001.

If the manual override switch 32 has not been depressed, the override flag is then appropriately set in state S1002. Alternatively, if the manual override switch 32 has been depressed, the controller 30 will reset the override flag in state S1003. This defeats any attempt to permanently "cheat" the five minute delay. Thereafter, the controller 30 moves to state S1004.

If the controller 30 is receiving a fault signal from, for example, the undervoltage detector, the controller 30 will stay at state S1004 indefinitely. Only (1) when a five minute time delay has elapsed and there is no fault, or (2) when there is no fault, the manual override button has been pushed and the override flag has been set, will the controller 30 will move to state S1005.

In practice, when the override flag has been set, the controller 30 delay three seconds (rather than the normal time of five minutes). The three second delay allows the serviceman to remove his hands from potentially dangerous areas before the controller 30 enables the motor unit 18 to being operation.

If there is no fault, but still the thermostat 16 has made no demand for either a first or second level action by the system 12, the controller 30 will remain at logic step S1005. Thus, when no fault is detected and more than five minutes has elapsed since the last time that a demand was made on the system 12, the controller 30 will remain at state S1005, ready to act should the thermostat 16 make a demand. Of course, if a fault ever is detected, the controller will move back to logic state S1004 and remain there indefinitely while the fault condition continues.

If no fault is detected and a first stage demand and no second stage is requested by the thermostat 16, the controller 30 will move to state S1006, where the controller 30 activates the first relay drive circuit 52 and gives a high signal to the second relay drive circuit 54. The controller 30 will remain at state S1006 until either a fault develops or the first stage demand stops.

Alternatively, if there is no fault detected and there is a second level demand signal from the thermostat 16, the controller 30 will move to state S1007 from state S1005. The controller 30 may then remain at state S1007, giving an activation signal to the first relay drive circuit 52 and sending a low signal to the second relay drive circuit 54.

Should a fault be detected while the controller 30 is in either state S1006 (low speed signal sent to the motor) or state S1007 (high speed signal sent to the motor), the controller 30 will move to state S1008.

If the number of faults that has been detected within the last demand period does not exceed a predetermined number, such as two, the controller 30 will move to state S1001 and again start a five minute delay before beginning to start operation of the system 12. However, if the number of instances of failure exceeds the predetermined number, then the controller 30 will move to state S1009. When in state S1009, a disable signal is sent to the first drive circuit 52. The controller 30 will stay in the lockout state S1009 as long as there is any type of demand signal issued by the thermostat 16.

Once in the lockout state S1009, however, the controller 30 may move out of the lockout state to the beginning state S1001 only if the thermostat 16 no longer issues any demand signal. Such an event may occur, for example, when the owner or operator of the system 12 corrects the error that caused the controller 30 to move to the lockout state and then manually adjusts the thermostat 16 so that it temporarily fails to issue any demand for a change in temperature.

When the controller 30 is in states S1006 and S1007, where either a high or low speed signal is being delivered to the motor, and the thermostat 16 stops delivering any demand signal, the controller 30 moves back to state S1000. In this state, the cycle counter is reset to zero. In this way, when another demand is issued and the controller 30 again reaches state S1008, only successive fault conditions will be counted.

Fault conditions which occurred before the most recent successful attempt at operation of the system will be ignored. That is, the controller 30 will only "count" failures since the last time that the system 12 worked successfully.

If, when the controller 30 is in state S1006, the thermostat 16 begins sending a high demand signal rather than no demand signal, the controller 30 moves to state S1010, rather than state S1000. In state S1010, the controller 30 begins a 60 second timer and moves to state S1011. Again providing that no fault is detected, the controller 30 then begins, in state S1011, counting for one minute while at the same time issuing an Off signal to the first relay drive circuit 52.

If, at the end of about one minute, the thermostat 16 has begun to request a low level action by the motor unit 18, the controller 30 will move back to state S1006. If the thermostat 16, however, is still issuing a high demand signal, the controller 30 will move to state S1007, allowing a low speed signal to be applied to the first relay drive circuit 52.

Similarly, however, if the controller 30 is at state S1007, the thermostat 16 stops sending a high demand signal and a low demand signal is present, the controller 30 will move to state S1010 to begin a 60 second counter and then move to state S1011. In this state S1011, as before, the motor unit 18 is shut off and, at the end of one minute, the controller 30 moves to the state that is still being requested by the thermostat 16. If this is still a low demand signal, then, of course, the controller 30 will move to state S1006.

As before, of course, whenever a fault is detected, the controller 30 will move to the state S1008 and increment the cycle counter. If the number of failures since the last successful operation of the system 12 has not been exceeded, the controller 30 will move to state S1001. Otherwise the controller will move to the lockout state S1009.

The circuitry used to accomplish the commands shown in the state diagram of FIG. 2 is set out in detail in FIG. 3. Particular circuit components shown in FIG. 1 have been somewhat arbitrarily redrawn as blocks of elements in FIG. 3. It is important to note, though, that many circuit elements do not necessarily belong in one block or the other or that they may belong in several blocks. Nonetheless, the blocks have been drawn in FIG. 3 to aid in the understanding of the present invention.

D.C. POWER SUPPLY 24

The D.C. power supply 24 is interconnected to the power source 14 from which it receives a 24 volt R.M.S., A.C. 60 hertz signal. The power supply 24 includes a voltage source 56, voltage regulator 58, and initialization circuit 60.

Voltage Source 56

The voltage source 56 includes a one amp fuse 62, varistor 64, rectifying diode 66, smoothing capacitor 68, current limiting resistor 70, pulse blocking capacitor 72, and coupling diode 74. The fuse 62, of course, helps protect the control 10 against damage if it should develop a short circuit. The varister 64 protects the control 10 from damage if the large voltage transient occurs in power source 14.

The rectifying diode 60 rectifies the incoming voltage to insure that only positive voltages are passed along to the voltage regulator 58. The smoothing capacitor 68 similarly helps smooth transient changes in voltage that may occur along the input line.

Twenty four volts are also applied from the power source 14 directly to the multiplexer 28 through the current limiting resistor 70. The capacitor 72 directs any sudden voltage increase along the 60 hertz line to ground, substantially preventing damage to the multiplexer 28.

Voltage Regulator 58

The voltage regulator 58 is a standard configuration to those skilled in the art, including first and second resistors 76, 78, a transistor 80, ripple smoothing capacitor 82, rectifying diode 84, zener diode 86, smoothing capacitor 88, and output line 90. The transistor 80 includes a base 92, collector 94, and emitter 96.

The first resistor 76 controls the current applied the base 92 of the transistor 80. The zener diode 86 insures that a substantially constant voltage, of approximately nine volts D.C., is supplied to the base 92 of the transistor 80. The capacitor 82 helps insure that the nine volts applied to the base 92 remains relatively constant, and the diode 84 compensates for the base 92 to emitter 96 voltage drop. The second resistor 78 controls the voltage across the collector 94 and emmitter 96 of the transistor 80. As a result, a fairly constant voltage is applied to the emitter 96 of the transistor 80 and received at the output line 90.

The voltage output of the regulator 58 is substantially equal to nine volts. The smoothing capacitor 88 insures that this nine volt output remains fairly constant during operation of the control 10.

Initialization Circuit 60

The initialization circuit 60 includes a voltage divider network 98, charging capacitor 100, 5.1 volt zener diode 102, secondary output voltage line 104, comparator (operational amplifier) 106, and first and second exclusive OR gates 108, 110. The comparator 106 has positive and negative inputs 112, 114.

The nine volt output line 90 is interconnected, via the voltage divider network 98, to the negative input 114 of the comparator 106. The positive input 112 of the comparator 106 is interconnected to the 5.1 zener diode 102 and the smoothing capacitor 100. The comparator 106 receives, as an input, the difference between the 5.1 volt output of the zener diode 102 and the nine volt output of the voltage divider network 98, which also approximately equals 5.1 volts. Thus, during normal operation of the control 10, the output of the comparator 106 is small.

The first exclusive OR gate 108 is interconnected to secondary voltage output line 104 and ensures that signals representing the state of the first relay drive circuit 52 are shunted away from the controller 30 during startup. The second exclusive OR gate 110 acts as a buffer between the first relay drive circuit 52 and controller 30 during normal operation of the control 10.

During initial startup of the control 10, however, the voltage supplied to the positive input 112 of the comparator 106 will reach 5.1 volts before the negative input 114 does. Thus, the comparator 106 will momentarily supply an input pulse to power the control 10, for approximately two hundred miliseconds, during "power-up" of the control 10. During such initialization, the secondary output voltage line 104 supplied power for the controller 30 as well as the multiplexer 28.

MANUAL OVERRIDE SWITCH 61

The manual override switch 32 includes a manual pushbutton 116 and an input line 118 interconnected to the multiplexer 28. Normally, when the pushbutton 116 is not depressed, a high voltage is applied, via the input line 118, to the multiplexer 28. With the switch 116 manually depressed, however, the input to the multiplexer 28 is effectively tied to ground, lowering the input and thus signalling the multiplexer 28 that an override condition is required.

UNDERVOLTAGE DETECTOR 36

The undervoltage detector 36 includes an electronic switch 120, comparator 122, hysteresis resistor 124, charging capacitor 126, smoothing capacitor 127, and voltage dividing resistors 128, 129. The comparator 122 includes positive and negative inputs 130, 132.

In normal operation, the positive input 130 to the comparator 122 receives the 24 volt input from the power source 14. The charging capacitor 126 stores a peak voltage of between 30 and 35 volts from the 24 volt R.M.S. signal of the power source 14.

The signal is then divided by the voltage dividing resistors 128, 129, and the resulting signal is compared to the 5.1 volt 112 is standard interconnected to the comparator's negative input 132.

The comparator 122 thus normally supplies a large signal which is received by the multiplexer 28. The smoothing capacitor 127 insures that a fairly constant voltage is applied over time.

If the voltage from the power source 14 significantly decreases, such as to 17.5 volts, the voltage applied to the positive input 130 of the comparator 122 will drop. As a result, the signal issued by the output of the comparator 122 will significantly decrease. The capacitor 128 will then discharge, and a low signal will eventually then be applied to the input of the multiplexer 28.

The hysteresis resistor 124 forms a hysteresis loop between the positive input 130 and output of the comparator 122. Thus, only when the signal applied to the positive input 130 climbs substantially, such as by 3 volts, will the comparator 122 again supply a large signal at its output. This high output will result in a large signal being applied to the input of the multiplexer 28.

During initial motor startup (or resetting) of the control 10, the controller 30 supplies a high voltage input to the electronic switch 120. As a result, a large positive voltage is applied to the positive input 130 of the comparator 120. Thus, the undervoltage detector 36 is effectively "shunted out" during the start up of the motor unit 18.

OPTO-ISOLATOR 26

The opto-isolator 26 includes first and second input lines 134, 136, a common line 138, first and second rectifying diodes 140, 142, first and second 13 volt zener diodes 144, 146, first and second optical isolators 148, 50, first and second charging capacitors, 152, 154, and the first and second stage output lines 40, 42. The first input line 134 receives a first stage input from the thermostat 16 while, of course, the second input line 136 receives a second stage input from the thermostat 16.

The rectifying diodes 140, 142 allow only positive signals to be applied to the optical isolators 148, 150. However, small noise signals on the lines are effectively blocked. A signal must have an amplitude of at least 13 volts to pass through the zener diodes 144, 146 to the optical isolators 148, 150. When activated, the first and second optical isolators 148, 150 interconnect, respectively, the first and second stage input lines 40, 42 to the nine volt output line 90 (VCC).

The first and second charging capacitors 152, 154 are, of course, charged by output line 90. Thus, during a momentary loss in the thermostat signal, one of the compacitors 152, 154 would continue to apply positive signals to the first or second stage output lines 40, 42 interconnected to the multiplexer 28. Should such a signal last for approximately 60 milliseconds, the capacitor would have discharged sufficiently such that a low signal would be provided to the multiplexer 28.

MULTIPLEXER 28

The multiplexer 28 includes a standard CMOS eight bit data selector. The multiplexer 28 receives the input line voltage, via the current limiting resistor 70, and receives signals from the first and second stage inputs 40, 42, manual override input line 118, and the undervoltage detector 36. The multiplexer 28 also receives an input from the controller 30 over the input select lines 46.

The multiplexer 28 supplies outputs to the controller 30 via the multiplexer output line 44. The controller 30 states which of the inputs it wishes to receive over the multiplexer output line 44 at any particular time.

CONTROLLER 30

The controller 30 includes a standard four bit microprocessor 152, such as, for example, the TMS1000 made by Texas Instruments, and an RC timing circuit 154.

The RC timing circuit 154 allows the internal clock of the microprocessor 152 to provide a 300 kilohertz signal within the microprocessor 152.

MICROPROCESSOR FAILURE DETECTION CIRCUITRY 39

The microprocessor failure detection circuitry 39 includes first and second exclusive OR gates 158, 160, a comparator 162, capacitor 164, and 60 hertz output 166. The exclusive OR gates 158, 160 and comparator 162 each include first and second inputs 168, 170, 172, 174, 176, 178.

During the initialization phase, where the voltage of the power supply 14 increases from zero to approximately 14 volts A.C., R.M.S., the first input 168 to the first exclusive OR gate 158 is high, and, of course, the second input 170, interconnected to the line 90, is high. Thus, the output of the first exclusive OR gate 158 is low, and this signal is supplied to the microprocessor 152.

After initialization, the first input 168 to the first exclusive OR gate 158 may be low. However, the line 90 and second input 170 are high, so that the first exclusive OR gate 158 provides a high voltage output to the microprocessor 152.

The microprocessor 152 also provides a positive signal to the second input 174 of the second exclusive OR gate 160. The microprocessor 152 sends a signal along the output 166 to the second exclusive OR gate 160. The signal is received at the second input 174. If the microprocessor 152 is functioning properly, this signal from the microprocessor 152 matches the signal applied to the first input 172 by the 60 hertz power line 47. If the signals do indeed match, the second exclusive OR gate 160 provides a low output and the capacitor 164 remains discharged. If the signals do not match, however, the capacitor 164 will charge, causing the comparator 162 to provide high output and disable the relay drive circuit 38.

RELAY DRIVE CIRCUITRY 38

First Relay Drive Circuit 52

The first relay drive circuit 52 includes a redundant check circuit 180 and a power circuit 182. The check circuit 182 includes a disable line 184, first and second transistors 186, 188, and relay circuit 190. The first transistor 186 includes an emitter 191 interconnected to the disable line 184 and a collector 192. The second transistor 188 includes a base 194 interconnected to the collector 192 of the first transistor 186 and a collector 196 interconnected to the normally open relay circuit 190. The relay circuit 190 includes top and bottom input lines 198, 200, a relay coil 202, and a switch 204.

When a high voltage disable signal is provided on the line 184, the voltage at the emitter 191 of the first transistor 186 goes to a high state, and the first transistor 186 turns off. Consequently, the voltage at the collector 192 of the first transistor 186 and at the base 194 of the second transistor 188 goes to a high state, and the second transistor 188 turns off. As a result, no current flows through the top line 198 of the normally open relay circuit 190, and the relay circuit 190 resumes its normally open position. As a result, no power is applied to the second relay drive circuit 54, and the motor unit 18 is kept off.

The power circuit 182 includes an input line 206, first and second redundant biasing diodes 208, 210, and a transistor 212. The transistor 212 includes a base 214 and collector 216. The redundant diodes 208, 210 absorb the current produced by the back EMF caused when current through the relay coil 202 is interrupted.

The input line 206 of the power circuit 52 is redundant with the disable line 184. An appropriate signal along either will cause the relay 189 to open.

During normal operation of the motor unit 18, the disable line 184 of the check circuit 180 is at a low voltage state, and the input line 206 of the power circuit 182 is at a high state. In such a condition, a high voltage is supplied to the top line 198 of the relay circuit 189.

In addition, a high voltage signal is supplied, by the input line 206 of the power circuit 182, and the base 214 of transistor 212. Consequently, the bottom line 200 of the relay circuit 190 is interconnected to ground. Current then flows through the relay coil 202, closing the relay switch 204. As a result, the switched 24 volt A.C. input line 47 is directly interconnected to the input of the second relay drive circuit 54.

Second Relay Drive Circuit 54

The second relay drive circuit 54 includes a transistor 218, diode 220, relay circuit 222, high and low contactor leads 224, 226, and a signal lead 228. The relay circuit 222 includes a relay coil 228 and a switch 230 with first and second opposing sets of contacts 232, 234.

When the controller 30 applies signals to the input lines 184, 206, power is applied to the relay circuit 222. The high and low contactor leads 224, 226 are then energized according to the signal applied to the input lead 228 of the second relay drive circuit 54.

If a high signal is applied to the input line 228 of the second relay drive circuit 54, the transistor 218 turns on, and current flows through the relay coil 228. As a result, the first set of contacts 232 in the switch 230 close, and the second set of contacts 234 open, thus providing a high signal along the high contactor lead 224 and no signal to the low contactor lead 226.

Conversely, if a low signal is applied to the signal lead 228 of the second relay drive circuit 54, substantially no current flows through the relay coil 228. The first set of contacts 232 in the switch 230 open but the second set of contacts 234 close, thus providing a switched 24 volt A.C. signal to the low contactor lead 226.

SWITCHED 24 VOLT A.C. LINE 47

The switched 24 volt A.C. input is interconnected to switches within the compressor (not shown). If, for example, pressure within the compressor reaches an unacceptably high level or some other predetermined condition occurs, the wave form of the switched 24 volt AC circuit power supply will not be a 60 Hz signal. As a result, the first exclusive OR gate 158 provides a DC signal to the microprocessor 152 and to the second exclusive OR gate 160. The microprocessor times the loss of signal and, if the signal is sustained, may art in response to the sensed condition.

FAULT DETECTOR 34

Figure 3B:
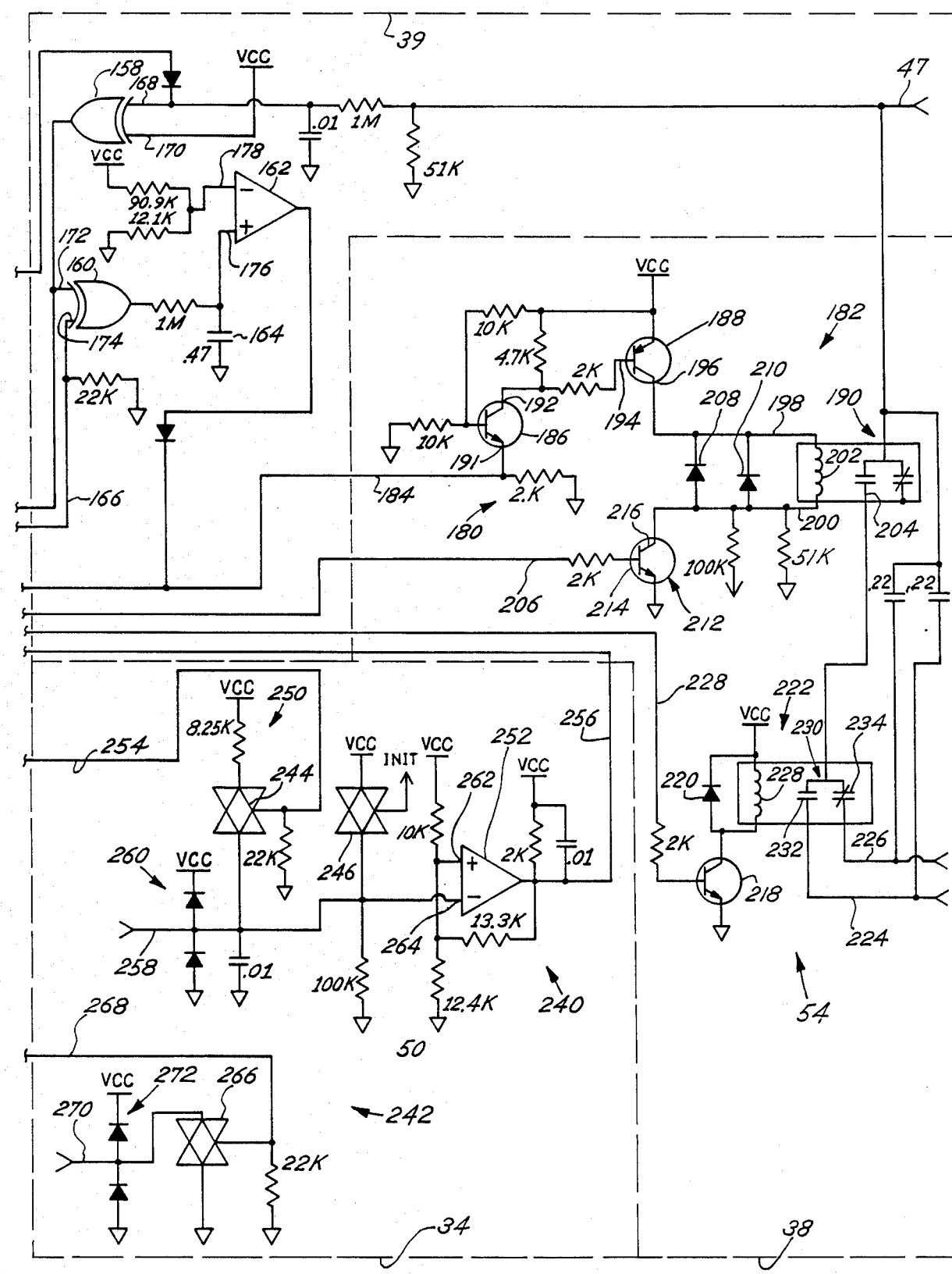
FIG. 3 is a detailed schematic diagram of the invention shown in FIG. 1.

As shown in FIG. 1, the fault detector 34 includes both a temperature sensor 48 and comparator 50. The temperature sensor 48 includes two or three Positive Temperature Coefficient thermistors (not shown) imbedded in the electric motor, and a PTC input lead 239. As shown in FIGS. 1 and 3B, the comparator includes first and second over temperature circuits 240, 242.

The first over temperature circuit 240 includes a first electronic switch 244, a electronic switch 246, a resistive voltage divider 250, operational amplifier 252, first test input lead 254, test output lead 256, PTC signal lead 258, and diode 260. The operational amplifier 252 includes positive and negative inputs 262, 264.

The second over temperature circuit 242 includes a third electronic switch 266, second test input lead 268, PTC signal lead 270, and diode 272. The PTC thermistors are interconnected between the PTC signal leads 258, 270.

The microprocessor 152 may provide a high signal along the first and second test input leads 254, 268, making the electronic switches 244, 246 conductive. During normal operation, the voltage applied to the negative input 264 of the operational amplifier 252 is low, and the output applied, via the line 256, to the microprocessor 152 should be high. If, for example, the operational amplifier 252 should malfunction and supply a low signal along line 256, the microprocessor 152 would then recognize that a fault has occurred.

Next, the microprocessor 152 may send a low signal, via the first test input lead 254, causing the electronic switch 244 to become substantially non-conductive. The microprocessor 152 may then apply low voltage along the first input test lead 254 and then the second input test lead 268. Unless the operational amplifier 252 then provides a high signal along lead 256, the microprocessor 152 will know that a fault has developed in the fault detector circuit itself and take appropriate action.

Then, the microprocessor 152 may send a high signal, via the first test input lead 254, and also send a low signal, via the second test input lead 268. Unless the operational amplifier 252 then provides a low signal along the lead 256, the microprocessor 152 will know that a fault has developed in the fault detector circuit itself.

The sequence of turning the electronic switches 244, 266 on and off occurs approximately 10 times per second, to assure that the microprocessor 152 is left apprised of the status of the temperature sensors in the motor unit 18 and of the condition of the fault detector 34 itself. The diodes 260, 272 shunt electronic noise (greater than VCC or less than 0 volts), to prevent such noise from improperly influencing the operation of the operational amplifier 252. The electronic switch 246 keeps the negative input 264 of the operational amplifier 252 low during the initialization stage, thus ensuring that a low signal is applied to the microprocessor 152, via the lead 256, during initialization.

Although the foregoing description of the preferred embodiment will enable a person of ordinary skill in the art to make and use the same, the following detailed object code for input to the microprocessor 152 is included. The listing provides detailed information concerning the programming and operation of the overall control 10. Additional detailed features of the control 10 will become apparent to those skilled in the art upon reviewing the source code.

```
************   (*********************************************:   ***********
                            OBJECT CODE INPUT TO T.I.
***************************************************************************
TMS1000 OBJECT: 'LENNOX' CREATED BY VERSION LC.A ASSEMBLER (6/79)
1B8042463BB24D6038A64D4D833A0F60128AB2B633338B36324239A4361C606C
92324D904C831830B64A00384D990060005A1A6A994C38468260F9006C306A60
1B80B110934A1AC33C0E1A86A583AA45124A0E03928397423A444A1C4E1C4560
92382A860348075647A41239443F86379C468A992A4DF9368610F9006037364D
1B808351A65EAB993A1C92999844384C12A698AE12129BCF1A12A13800A13931
921C383944124CAC924692184E3A334D834D923ABAAEA90F33441C37AB310037
1B803A4EA8A90F601AF9483838480060928388EE888839A438AA14886C355260
A8445C6C46AA4437124E444DB69B4A429A4A3A35A40F18C3004C3700A80F3068
1B808D440D433E23234A922A0C438D0A120A470C12124CAD00123C6C4C43854C
923E443012124C9D9283923C34033C8D3400A20116AD9A0130082A083E3EBC38
1B8034233C0F6F3C40031203353C6A421208030F92926A0F6900035F2A2A1203
929D033F0B0F4D8B472A12989D0F43F95D03352A3F599C009A468BF98303423F
1B801C480CF99B393948839F3597BBAD12B45035121E991AC342D11F40489711
92C3453BAC26003B92EE9B311311EE5010971EA21A0083EE39A7311A39D111C2
1B803946AD86132112114219128 31F0011A4A28348139B84AE92003CE67C7846
834C2C8B4B0D47830D2DD7727A211A13A6394074271E4FA14C19AD70B6A60222
1B804D486E31AD39BA640F00433B0082123F00601212C331C36E83B4D131BFD1
92F9435035603C3192359213101F0FBC1CEE6448489BB8391A0D19AB45S0EE1A
1B8042484C0D1123BB3B11A30C83AB0A121D1AB292834D3EA18ACB13624E4213
9203B13C260D4C9D4746123E2A134D97B80C4C023C97CBC242460211219E3BCB
1B8036442E003C3A2E3ECB363C440289128C304B1F48470186119C3234A2404F
9244478C8C136F2297000D882832B4BC3C348347302A004700234B893E3844BC
1B800CDD104F24581C7A852C761F83A712727CB18314AB8B40A77478224E54DD
A44E9E28A27E181F4B1C712C081040DD03421483834FB8A70F170D57A7DDA75B
1B8011444283000DB2D7CB4E48033A4AB540C238B2384A2FCB0C380F2C963A0C
B5BA0C031ECBA8CB43111EA40DD708CB3A40CB0C9112408297444DAFBA394C0F
440D0B2F0707653C008CA4B20E023CDC1228072C1212DA1DB20F4FB824DCDA3E
92DA05008C12B4079206923F070F833D3E2C4F2F21DC0EB26AB23E0707DA3CDC
1B8054430DAE4C6023B70D0D547DBB60120A882492B7839C038A88882C200867
920B4E93B7B70A2A477B121F40730C2245750C434AA7484082AC5F0302216E40
```

1B800D402315382F3B0A3AA5159750541283CB139E9E30400F3B231C838F03BD
9240424D1544CB208913384D004C1A3DFA90BE3C0A6AAE035803413F3E0CBB0D

```
************    *****************************************    ************
***************************************************************************
************                                                  ************
************            M32251            TMS1000             ************
************                                                  ************
***************************************************************************
***************************************************************************
```

```
OPERATING VOLTAGE      9 VOLT
PACKAGE TYPE           PLASTIC
PLASTIC PIN OPTION     400 MIL WIDTH   70 MIL PIN SPACING

INSTRUCTION SET        STANDARD

INPUT DEFINITION       OPTIONS = 50 KOHM, NO PULLDOWN, NOT USED

K1 - 50 KOHM PULL DOWN
                       K2 - 50 KOHM PULL DOWN
                       K4 - 50 KOHM PULL DOWN
                       K8 - 50 KOHM PULL DOWN

R OUTPUT DEFINITION    OPTIONS = OPEN DRAIN, 50UA, NOT USED

R0 - OPEN DRAIN
                       R1 - OPEN DRAIN
                       R2 - OPEN DRAIN
                       R3 - OPEN DRAIN
                       R4 - OPEN DRAIN
                       R5 - OPEN DRAIN
                       R6 - OPEN DRAIN, NOT USED
                       R7 - OPEN DRAIN
                       R8 - OPEN DRAIN, NOT USED
                       R9 - OPEN DRAIN, NOT USED
                       R10- OPEN DRAIN

O OUTPUT DEFINITION    OPTIONS = OPEN DRAIN, 50UA, 125UA, 225UA, NOT USED

OPTIONS = 60 OHMS, 130 OHMS, NOT USED

O0 - 60 OHMS,OPEN DRAIN, NOT USED
                       O1 - 60 OHMS,OPEN DRAIN, NOT USED
                       O2 - 60 OHMS,OPEN DRAIN
                       O3 - 60 OHMS,OPEN DRAIN, NOT USED
                       O4 - 60 OHMS,OPEN DRAIN, NOT USED
                       O5 - 60 OHMS,OPEN DRAIN
                       O6 - 60 OHMS,OPEN DRAIN
                       O7 - 60 OHMS,OPEN DRAIN
```

```
************     ******************************************    ************
                              OPLA DEFINITION
****************************************************************************
OPLA
OUTB ----1=10000000
OUTB ---1-=01000000
OUTB --1--=00100000
OUTB -1---=00000100
OUTB 1----=00000001
```

O-LINE DEFINITIONS FROM THE OPLA FILE

```
          S AAAA  00000000
          L 8421  76543210
          ------------------
          0 0000  00000000
          0 0001  10000000
          0 0010  01000000
          0 0011  11000000
          0 0100  00100000
          0 0101  10100000
          0 0110  01100000
          0 0111  11100000
          0 1000  00000100
          0 1001  10000100
          0 1010  01000100
          0 1011  11000100
          0 1100  00100100
          0 1101  10100100
          0 1110  01100100
          0 1111  11100100
          1 0000  00000001
          1 0001  10000001
          1 0010  01000001
          1 0011  11000001
          1 0100  00100001
          1 0101  10100001
          1 0110  01100001
          1 0111  11100001
          1 1000  00000101
          1 1001  10000101
          1 1010  01000101
          1 1011  11000101
          1 1100  00100101
          1 1101  10100101
          1 1110  01100101
          1 1111  11100101
```

© 1987 LENNOX INDUSTRIES INC.

A preferred embodiment of the present invention has been described herein. It is to be understood, however, that changes and modifications can be made without departing from the true scope and spirit of the present invention. This true scope and spirit are defined by the following claims, and their equivalents, to be interpreted in light of the foregoing specification.

What is claimed is:

1. A control for regulating the operation of a two-speed motor in a heat transfer system, said control receiving a thermostat demand signal from a thermostat and said motor operating at speed dependant upon said thermostat demand signal, said control system comprising, in combination:

initial timer means for detecting the occurence of said thermostat demand signal and delaying said thermostat demand signal for a first predetermined period of time;

motor speed operator means for receiving said delayed thermostat demand signal and responsively issuing a speed control signal to said two-speed motor dependant upon said delayed thermostat demand signal; motor relay drive means for supplying power to said two-speed motor; and speed change delay means for detecting a sequential change in said delayed thermostat demand signal and temporarily disabling said motor relay drive means for a second predetermined period of time before said motor speed operator means issues a new speed control signal to said two-speed motor dependant upon said sequentially changed thermostat demand signal.

2. A control as claimed in claim 1 further comprising:

fault sensing means within said two-speed motor for detecting two-speed motor fault conditions and issuing fault signals in response to said conditions; and fault monitoring means for receiving said fault signals and inhibiting operation of said two-speed motor in response to said fault signals.

3. A control as claimed in claim 2 wherein said fault monitoring means further comprises:

fault signal count means for incrementing a fault count number in response to each fault signal received;

initial timer enabling means for issuing an enable signal to said initial timer means for delaying said thermostat demand signal when said fault count number is less than a predetermined value;

lockout means for disabling said motor relay means when said fault count number exceeds said predetermined value and upon detection of said thermostat demand signal by said lockout means.

4. A control as claimed in claim 3 further comprising reset means for receiving said thermostat demand signal and said fault signal and responsively resetting said fault count means to an initial value when said reset means fails to detect said thermostat demand signal and said fault signal.

5. A control as claimed in claim 2 further comprising a manual override switch for receiving a manual input and responsively reducing said first predetermined period of time for delaying said thermostat demand signal.

6. A control as claimed in claim 2 wherein said fault sensing means monitors temperature within said motor and insures said fault signal when said temperature exceeds a predetermined value.

7. A control as claimed in claim 2 wherein an electrical voltage is applied to said motor and wherein said fault sensing means monitors said voltage and issues a fault signal when said voltage falls below a predetermined value.

8. A control as claimed in claim 2 wherein said thermostat and control each use a 30 volt 3.2 ampere maximum power source and wherein said control system further comprises an opto-isolator for receiving said thermostat demand signal and responsively transmitting said thermostat demand signal, said optoisolator further isolating the thermostat's power source from the control's power source.

* * * * *